June 28, 1938.  G. O. TAYLOR  2,121,995

FILLET PISTON PACKING

Filed April 26, 1937

INVENTOR.
GEORGE O. TAYLOR
BY McConkey + Booth
ATTORNEYS.

Patented June 28, 1938

2,121,995

UNITED STATES PATENT OFFICE 2,121,995

FILLET PISTON PACKING

George O. Taylor, Cicero, Ill., assignor to The Lubrication Corporation, Chicago, Ill., a corporation of Delaware Application April 26, 1937, Serial No. 138,869

3 Claims. (Cl. 221—47.3)

This invention relates to cartridges for lubricant or the like and more particularly to factory-filled cartridges or containers in which one end is closed by a slidably mounted piston.

In cartridges of this type it is essential that the piston be packed to prevent leakage of the cartridge contents past it both during storage and during use. However, since the cartridge is intended for only one use it is necessary to keep the cost of such packing, including its cost of assembly in the cartridge, at a very low figure.

It is one of the objects of the present invention to provide a cartridge in which the piston is effectively packed simply and inexpensively.

Another object of the invention is to provide a packing for a cartridge piston which may be assembled in the cartridge quickly and easily.

Figure 1:
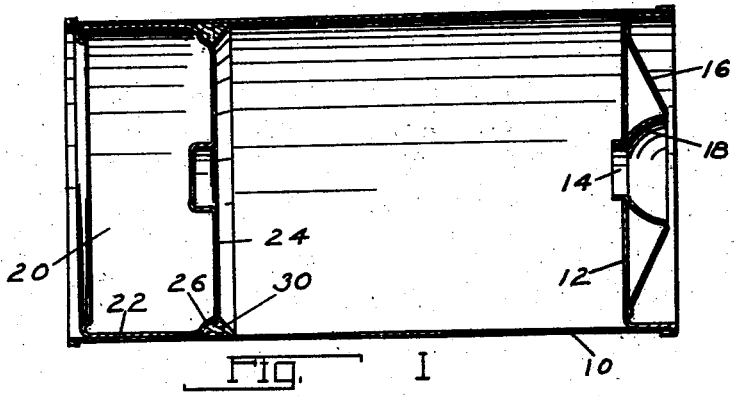
Figure 2:
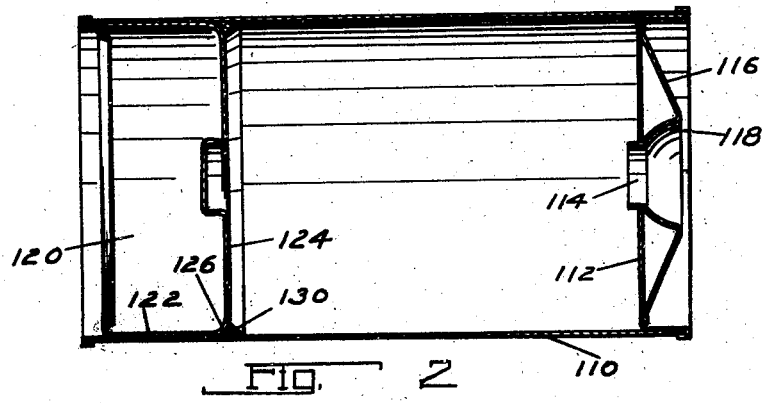

Other objects, advantages and novel features of the invention will be apparent from the following description of the embodiments shown in the accompanying drawing in which:

Figures 1 and 2 are axial sections through two cartridges embodying the invention.

The cartridge of Figure 1 comprises a hollow cylindrical body 10 of sheet metal, paper, or other suitable material having a head 12 permanently secured to one end thereof. The head 12 is formed with a central outlet opening 14 which is surrounded by a generally V-shaped annular member 16 of the type more particularly disclosed and claimed in the application of Harry R. Tear No. 140,077, filed May 1, 1937. A concave spherical surface 18 on the member 16 is formed for sealing engagement with an inlet stud on a dispensing device, as shown, for example, in the patent to Dodge No. 1,987,002.

The opposite end of the body is closed by a piston 20 slidably mounted therein and having an annular flange portion 22 substantially parallel to the body side wall and a face portion 24 conforming in shape to the head 12. The flange and face portions are connected by a curved portion 26 shown as offset inwardly to form an annular peripheral groove in the piston face.

In order to prevent leakage between the piston and cartridge body, an annular packing ring 30 of yieldable material such as natural or synthetic rubber or glue composition is loosely placed in the groove formed by the curved portion 26 in engagement with the body side wall. The packing ring is preferably of triangular cross-section and is placed in the cartridge with a straight side engaging the body and with another side lying at an angle to the cartridge axis engaging the piston. This provides a tapered portion extending into the cartridge in contact with the contents thereof.

The packing ring 30 seals against both the piston and body side wall to seal the joint therebetween against leakage. When the cartridge contents are placed under pressure to force them out the outlet opening, as by pressing on the piston 20, a pressure is exerted on the packing ring 30 to force it more tightly into engagement with the piston and to urge the tapered portion thereof into closer engagement with the body side wall.

Figure 2 illustrates a modified form in which parts corresponding to like parts in Figure 1 are indicated by the same reference numerals plus 100. The curved portion 126 of Figure 2 forms merely an arc rather than a groove. In this case the packing ring 130 rests against the curved portion 126 and is held in place by its natural friction as well as by the pressure of the cartridge contents thereon.

While two embodiments of the invention have been shown and described it will be understood that many changes might be made therein and it is not intended to be limited to the exact forms shown nor otherwise than by the terms of the appended claims.

What is claimed is:

1. A cartridge for lubricant or the like comprising a hollow body, a piston slidably mounted in said body and a packing for the piston including a ring of yieldable material of triangular cross section with a straight side of the section lying against the body side wall and another side of the section engaging the face of the piston at its periphery and the third side of the section being exposed to the cartridge contents throughout its entire area.

2. A cartridge for lubricant or the like comprising a hollow body, a piston slidably mounted in said body and including a skirt portion substantially parallel to the body and a face portion connected to the skirt portion by a curved portion, and an annular packing ring loosely positioned in the cartridge in engagement with said curved portion and with the body side wall, said packing ring including a tapered portion projecting into the cartridge to be pressed against the body wall by pressure of the cartridge contents thereon.

3. A cartridge for lubricant or the like comprising a hollow body, a piston slidably mounted in said body and including a skirt portion substantially parallel to the body and a face portion connected to the skirt portion by a curved portion, and an annular packing ring loosely positioned in the cartridge in engagement with said curved portion and with the body side wall, said packing ring being of triangular cross section with a straight side of the section engaging the body side wall and with a side lying at an angle to the cartridge axis engaging said curved portion.

GEORGE O. TAYLOR.